US012648015B2

(12) United States Patent
Manolakos et al.

(10) Patent No.: US 12,648,015 B2
(45) Date of Patent: Jun. 2, 2026

(54) COLLISIONS RULES CONSIDERATIONS BETWEEN PRS AND OTHER DOWNLINK CHANNELS

(71) Applicant: QUALCOMM Incorporated, San Diego, CA (US)

(72) Inventors: Alexandros Manolakos, Escondido, CA (US); Sony Akkarakaran, Poway, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 345 days.

(21) Appl. No.: 18/576,348

(22) PCT Filed: Jun. 29, 2022

(86) PCT No.: PCT/US2022/035566
§ 371 (c)(1),
(2) Date: Jan. 3, 2024

(87) PCT Pub. No.: WO2023/033911
PCT Pub. Date: Mar. 9, 2023

(65) Prior Publication Data
US 2025/0008548 A1     Jan. 2, 2025

(30) Foreign Application Priority Data

Sep. 3, 2021     (GR) ............................... 20210100583

(51) Int. Cl.
*H04W 72/566*     (2023.01)
*H04W 72/0446*     (2023.01)
*H04W 72/231*     (2023.01)
(52) U.S. Cl.
CPC ..... *H04W 72/566* (2023.01); *H04W 72/0446* (2013.01); *H04W 72/231* (2023.01)

(58) Field of Classification Search
CPC ............. H04W 72/566; H04W 72/231; H04W 72/0446
(Continued)

(56) References Cited

U.S. PATENT DOCUMENTS

2020/0252186 A1     8/2020  Yu et al.
2021/0100021 A1     4/2021  Xu et al.
(Continued)

FOREIGN PATENT DOCUMENTS

EP          3836696 A1     6/2021

OTHER PUBLICATIONS

International Search Report and Written Opinion—PCT/US2022/035566—ISA/EPO—Oct. 7, 2022.
(Continued)

*Primary Examiner* — Chuck Huynh
(74) *Attorney, Agent, or Firm* — Procopio, Cory, Hargreaves & Savitch LLP

(57)          ABSTRACT

Method and apparatus for collision rules between PRS and other downlink channels. The apparatus determines a PRS priority configuration including a priority for a collision between a PRS occasion and a first downlink channel. The apparatus receives an indication that schedules the first downlink channel. The first downlink channel scheduled to potentially collide with the PRS occasion. The apparatus determines that a time interval between the indication that schedules the first downlink channel and the PRS occasion is greater than a first threshold. The time interval is based on a separation between at least a last symbol of the indication and a first symbol of the PRS occasion. The apparatus applies the PRS priority configuration if the first downlink channel collides with the PRS occasion and the time interval is greater than the first threshold.

39 Claims, 12 Drawing Sheets

(58) Field of Classification Search
USPC ......................................................... 370/336
See application file for complete search history.

(56) References Cited

U.S. PATENT DOCUMENTS

| | | | | | |
|---|---|---|---|---|---|
| 2023/0199696 | A1* | 6/2023 | Ren | ....................... | H04L 5/0048 |
| 2023/0269059 | A1* | 8/2023 | Kuo | ...................... | H04L 5/0096 |
| | | | | | 370/329 |

OTHER PUBLICATIONS

Mediatek: "Discussion on General Aspects of UE Measurement for NR POS", 3GPP TSG-RAN WG4 Meeting #94-e-bis, R4-2003512, 3rd Generation Partnership Project, Mobile Competence Centre, 650, Route Des Lucioles, F-06921 Sophia-Antipolis Cedex, France, vol. RAN WG4, No. Online Meeting, Electronic Meeting, Apr. 20, 2020-Apr. 30, 2020 2 Pages, Apr. 10, 2020, XP051872108, paragraph [0002].
Mediatek: "Discussion on PRS-RSTD Measurement", 3GPP TSG-RAN WG4 Meeting #94-e, R4-2000998, 3rd Generation Partnership Project, Mobile Competence Centre, 650, Route Des Lucioles, F-06921 Sophia-Antipolis Cedex, France, vol. RAN WG4, No. Electronic Meeting, Feb. 24, 2020-Mar. 6, 2020, 7 Pages, Feb. 14, 2020, paragraph [0004].
Vivo: "Discussion on Potential Positioning Enhancements", 3GPP TSG RAN WG1 #103-e, R1-2007666, 3GPP, Mobile Competence Centre, 650, Route Des Lucioles, F-06921, Sophia-Antipolis Cedex, France, vol. RAN WG1, No. e-Meeting, Oct. 26, 2020-Nov. 13, 2020, Oct. 17, 2020, XP051939828, 49 Pages, paragraph [3.1.2], p. 30.

* cited by examiner

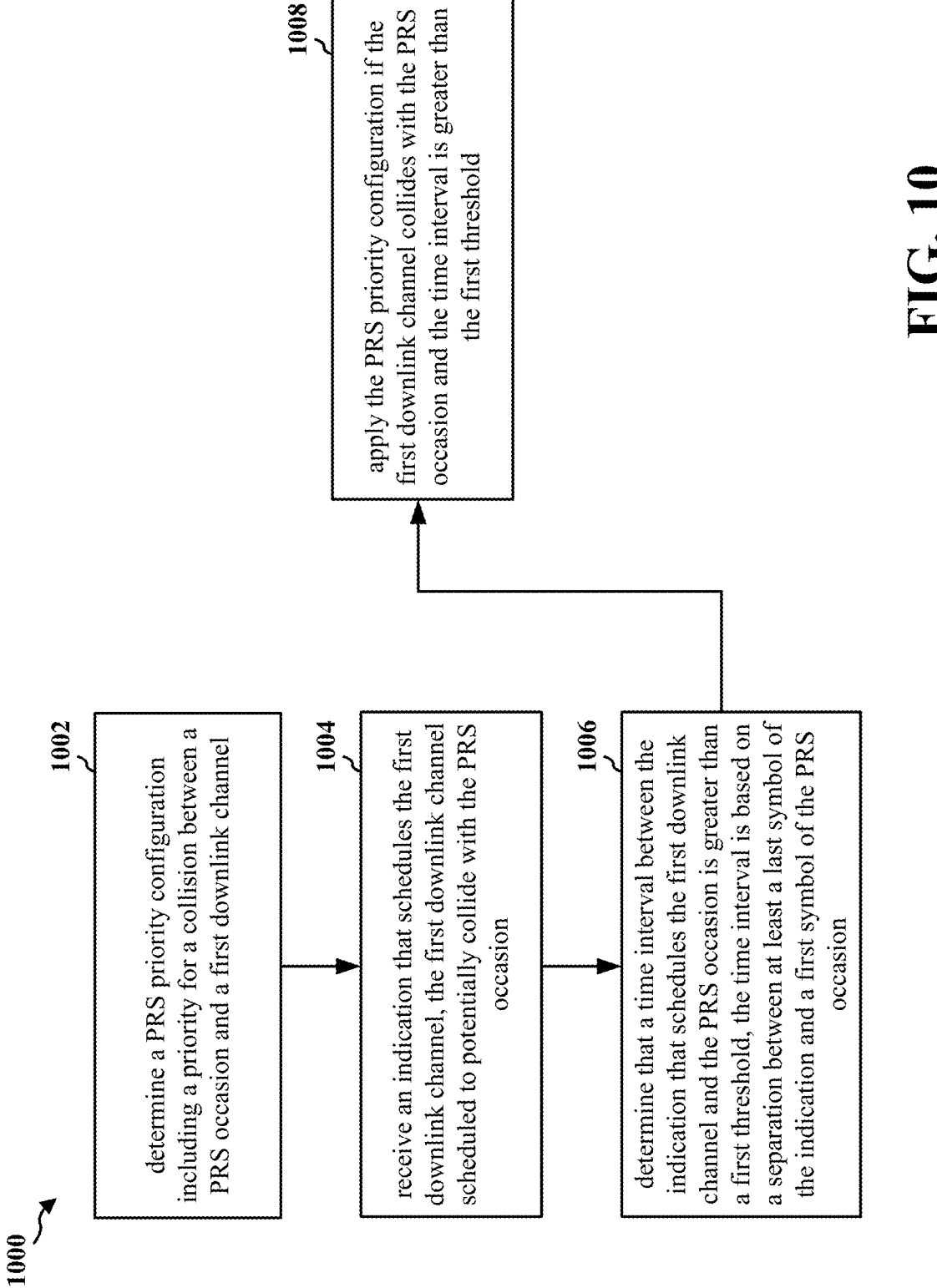

1002 determine a PRS priority configuration including a priority for a collision between a PRS occasion and a first downlink channel

1004 receive an indication that schedules the first downlink channel, the first downlink channel scheduled to potentially collide with the PRS occasion

1006 determine that a time interval between the indication that schedules the first downlink channel and the PRS occasion is greater than a first threshold, the time interval is based on a separation between at least a last symbol of the indication and a first symbol of the PRS occasion

1008 apply the PRS priority configuration if the first downlink channel collides with the PRS occasion and the time interval is greater than the first threshold

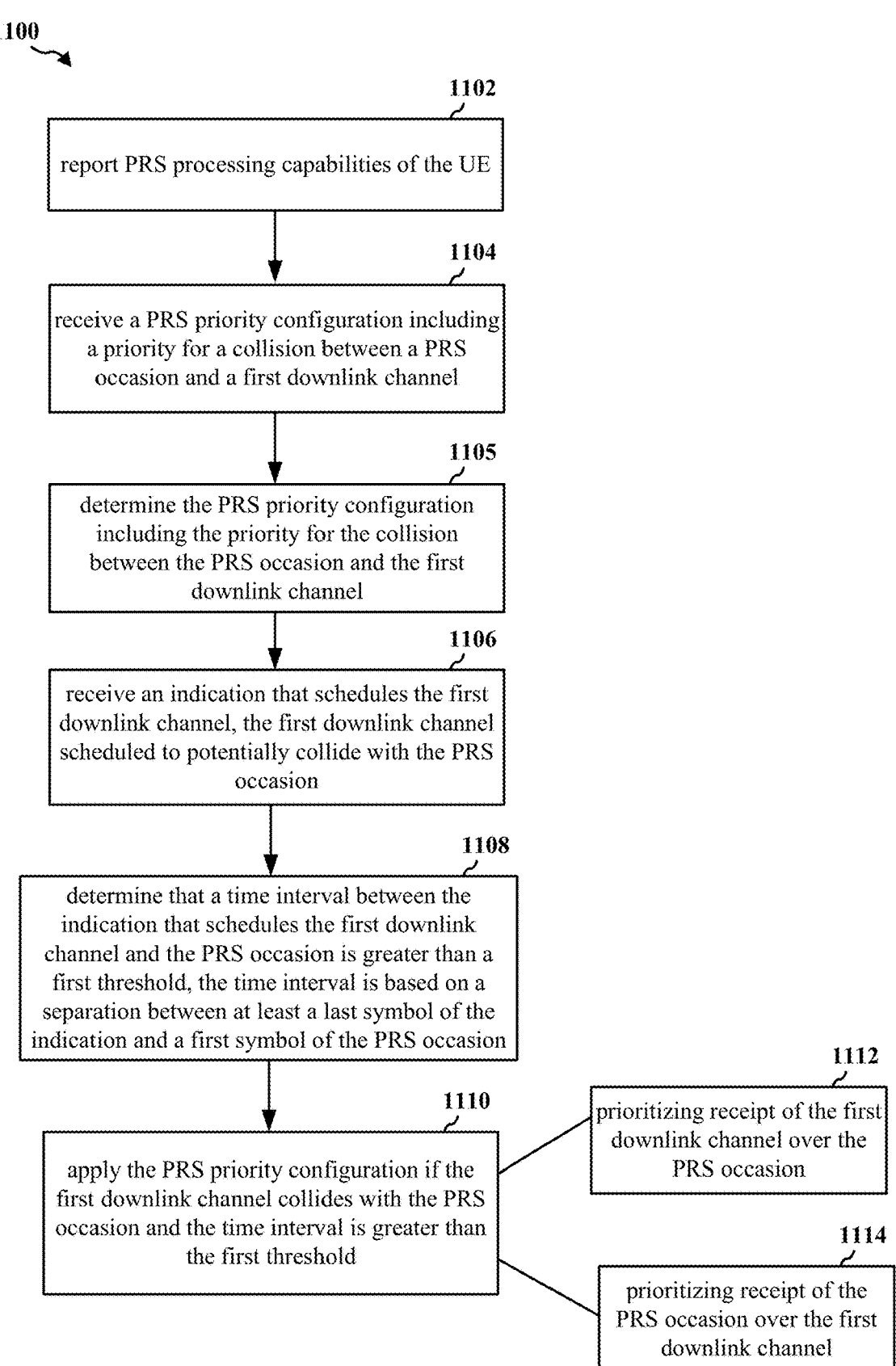

1100

1102
report PRS processing capabilities of the UE 1104
receive a PRS priority configuration including a priority for a collision between a PRS occasion and a first downlink channel 1105
determine the PRS priority configuration including the priority for the collision between the PRS occasion and the first downlink channel 1106
receive an indication that schedules the first downlink channel, the first downlink channel scheduled to potentially collide with the PRS occasion 1108
determine that a time interval between the indication that schedules the first downlink channel and the PRS occasion is greater than a first threshold, the time interval is based on a separation between at least a last symbol of the indication and a first symbol of the PRS occasion 1110
apply the PRS priority configuration if the first downlink channel collides with the PRS occasion and the time interval is greater than the first threshold 1112
prioritizing receipt of the first downlink channel over the PRS occasion 1114
prioritizing receipt of the PRS occasion over the first downlink channel

FIG. 11

COLLISIONS RULES CONSIDERATIONS BETWEEN PRS AND OTHER DOWNLINK CHANNELS

CROSS-REFERENCE TO RELATED APPLICATION

This application is a National Stage Application filed under 35 U.S.C. § 371 of PCT International Application Serial No. PCT/US2022/035566 entitled "COLLISIONS RULES CONSIDERATIONS BETWEEN PRS AND OTHER DOWNLINK CHANNELS" and filed on Jun. 29, 2022, which claims the benefit of Greek patent application Ser. No. 20210100583, entitled "COLLISIONS RULES CONSIDERATIONS BETWEEN PRS AND OTHER DOWNLINK CHANNELS" and filed on Sep. 3, 2021, which are expressly incorporated by reference herein in their entirety.

TECHNICAL FIELD

The present disclosure relates generally to communication systems, and more particularly, to a configuration for collisions rules considerations between positioning reference signals (PRS) and other downlink channels.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a UE. The device may be a processor and/or a modem at a UE or the UE itself. The apparatus receives a positioning reference signal (PRS) priority configuration including a priority for a collision between a PRS occasion and a first downlink channel. The apparatus determines an indication that schedules the first downlink channel. The first downlink channel scheduled to potentially collide with the PRS occasion. The apparatus determines that a time interval between the indication that schedules the first downlink channel and the PRS occasion is greater than a first threshold. The time interval is based on a separation between at least a last symbol of the indication and a first symbol of the PRS occasion. The apparatus applies the PRS priority configuration if the first downlink channel collides with the PRS occasion and the time interval is greater than the first threshold.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 10 is a flowchart of a method of wireless communication.

FIG. 11 is a flowchart of a method of wireless communication.

DETAILED DESCRIPTION

Figure 1:
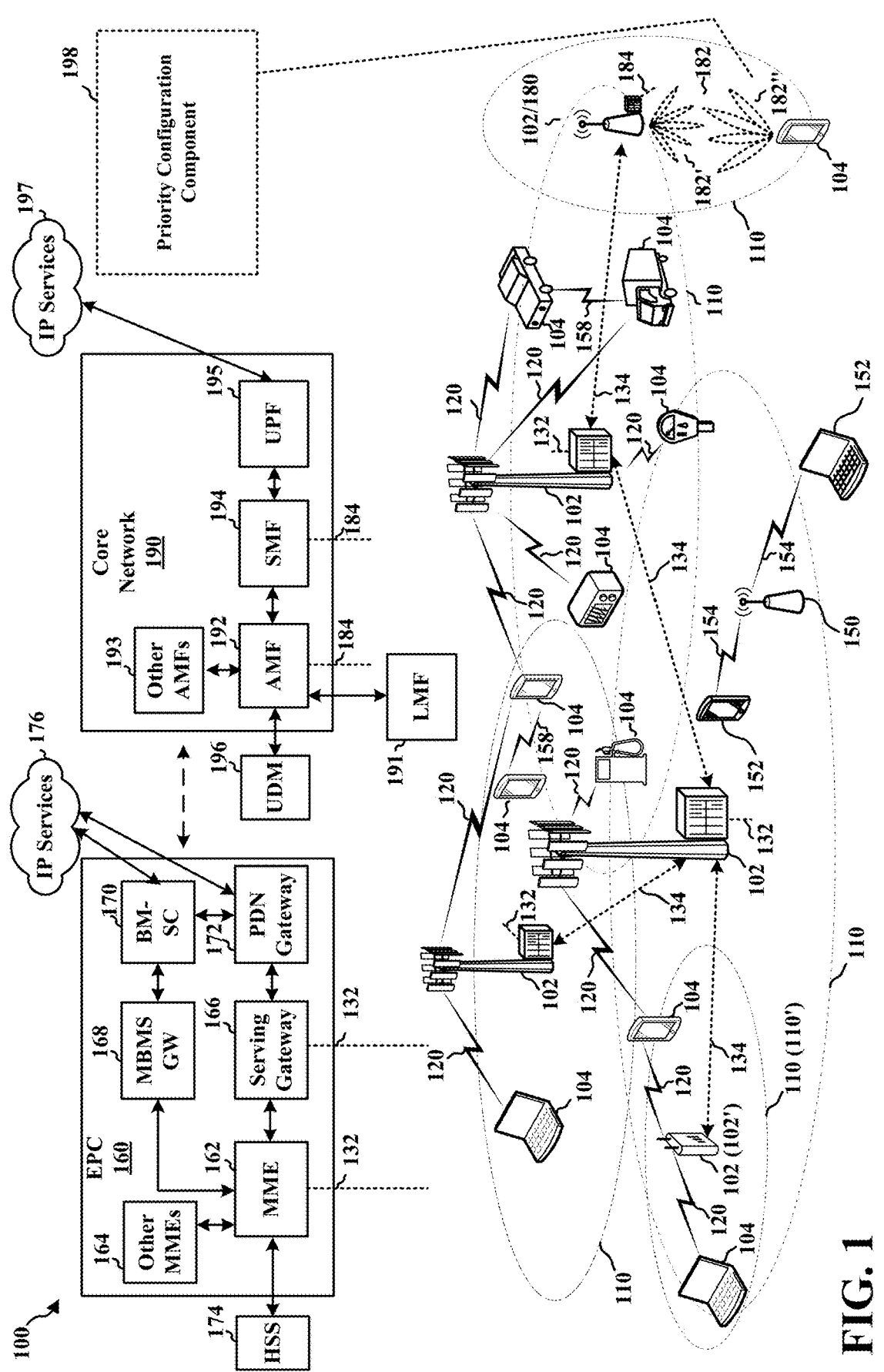
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP-GAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHZ). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHz), FR4 (52.6 GHz-114.25 GHZ), and FR5 (114.25 GHZ-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHZ spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services. In some instances, the core network 190 may communicate with a location management function (LMF) 191. The LMF may be utilized in positioning architecture. The LMF may receive measurements and assistance information from the NG-RAN and the UE 104 via the AMF 192. The LMF may utilize the measurements and assistance information to compute the position of the UE 104.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured to determine to apply a PRS priority configuration in the event of a collision between PRS and a downlink channel. For example, the UE 104 may comprise a priority configuration component 198 configured to determine to apply a PRS priority configuration in the event of a collision between PRS and a downlink channel. The UE 104 may determine a PRS priority configuration including a priority for a collision between a PRS occasion and a first downlink channel. The UE 104 may receive an indication that schedules the first downlink channel. The first downlink channel scheduled to potentially collide with the PRS occasion. The UE 104 may determine that a time interval between the indication that schedules the first downlink channel and the PRS occasion is greater than a first threshold. The time interval is based on a separation between at least a last symbol of the indication and a first symbol of the PRS occasion. The UE 104 may apply the PRS priority configuration if the first downlink channel collides with the PRS occasion and the time interval is greater than the first threshold.

Although the following description may be focused on 5G NR, the concepts described herein may be applicable to other similar areas, such as LTE, LTE-A, CDMA, GSM, and other wireless technologies.

Figures 2A, 2B, 2C, 2D:
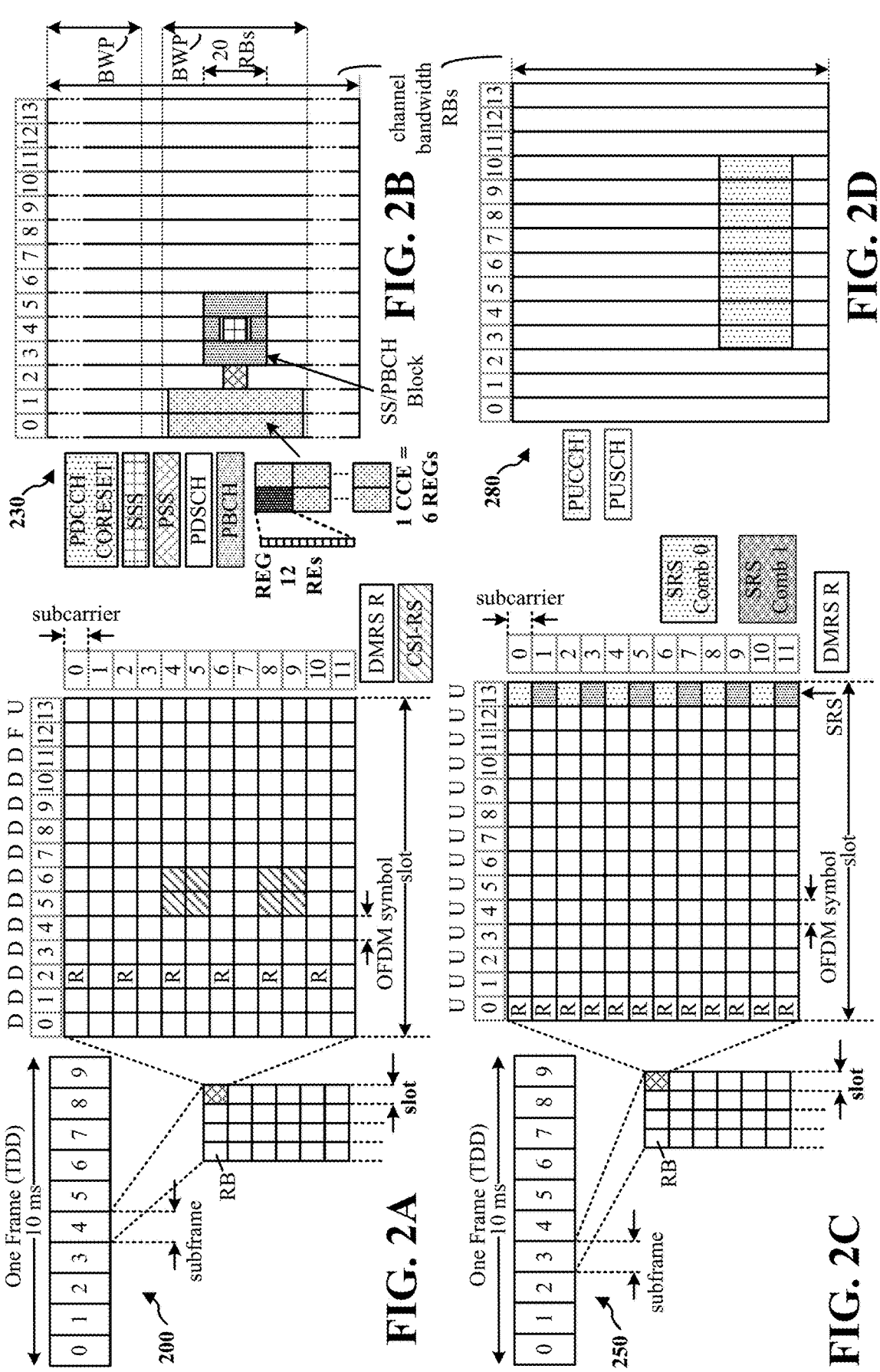
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology u, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
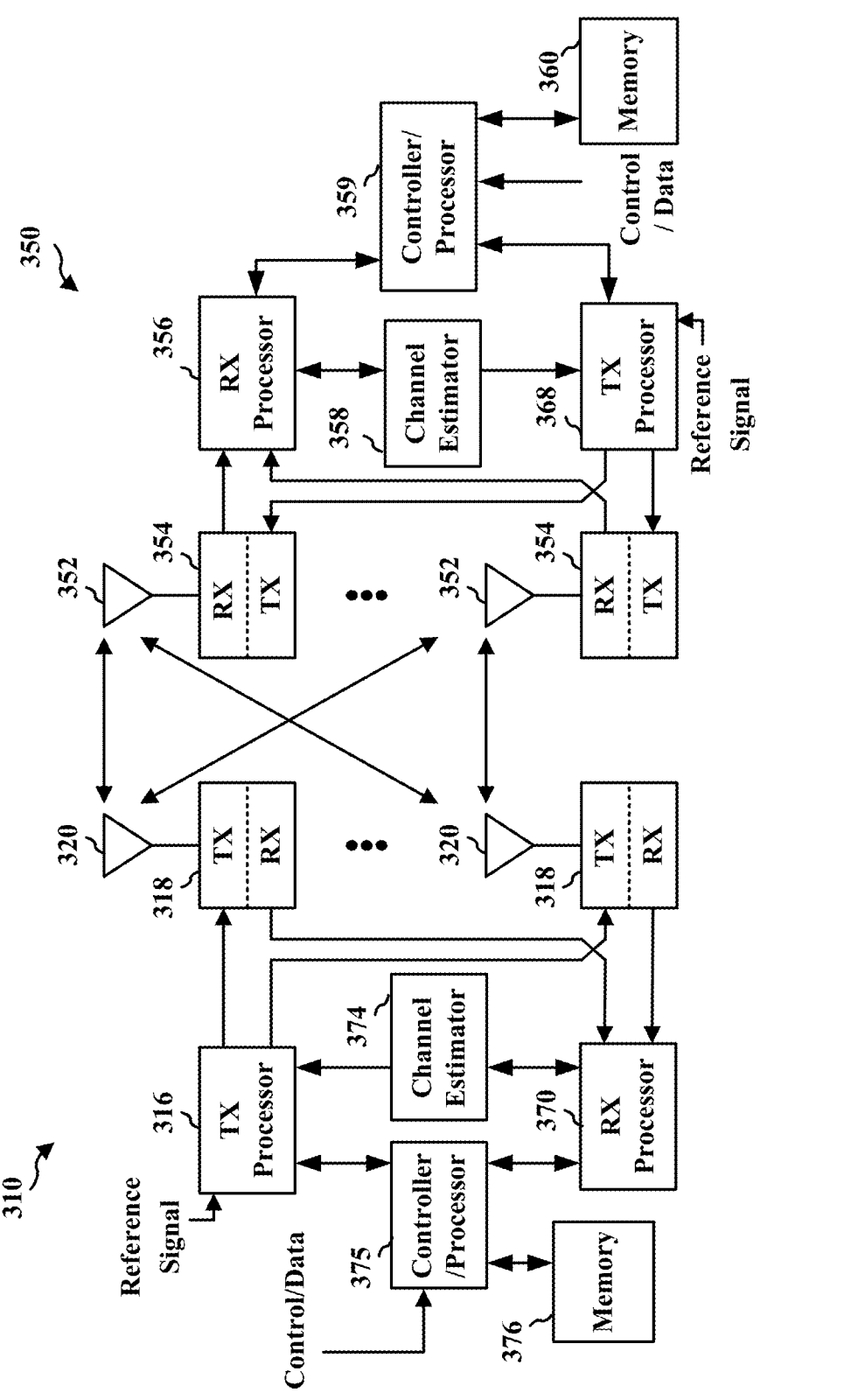
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

In wireless communication systems, such as but not limited to LTE or NR, PRS may have a lower priority than other channels. A UE may not expect to process a downlink PRS in the same symbol where other downlink signals and channels are transmitted to the UE when there is no measurement gap configured to the UE. Positioning measurements may encounter latency at the PHY-layer, as shown for example in Table 1:

TABLE 1

| PRS Processing Capabilities | Values |
| --- | --- |
| Maximum number of PRS resources per slot the UE can process | 1, 2, 4, 6, 8, 12, 16, 24, 32, 48, 64 |
| Maximum PRS symbols (in msec) per T msec window a UE can buffer and process | T: {8, 16, 20, 32, 40, 80, 160, 320, 640, 1280} ms<br>N: {0.125, 0.25, 0.5, 1, 2, 4, 6, 8, 12, 16, 20, 25, 30, 32, 35, 40, 45, 50} ms |

Figure 4:
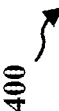
FIG. 4 is a diagram illustrating an example of positioning measurements.

The measurement period for each positioning frequency layer may be based at least one the reported capabilities of the UE, the PRS periodicity, the measurement gap periodicity, or the number of receive beams (e.g., in FR2). In some instances, the estimated minimum downlink PRS measurement time may be 88 ms in instances where one downlink PRS frequency layer is in FR1, downlink PRS reference signal time difference (RSTD) measurements are done across for downlink PRS instances, both downlink PRS periodicity and measurement gap repetition period (MGRP) are equal to 20 ms, or the configured downlink PRS resources are within the UE downlink PRS processing capacity (N, T)=(0.5 ms, 8 ms). For example, diagram 400 of FIG. 4 provides an example of the downlink PRS periodicity and MGRP being 20 ms (e.g., 402) and the UE downlink PRS processing capacity being 0.5 ms (e.g., 404).

In some instances, a small PRS periodicity in combination with single-instance measurements and small time domain PRS footprint may assist in improving the PHY layer latency. For example, PRS processing without a measurement gap may introduce a PRS processing window during which the UE may be expected to drop all other processing, channels, and/or procedures except PRS. In another example, a UE configured with enhanced PRS processing capabilities may include separate or new PRS processing capabilities when low-latency PRS measurements are requested. This may include a processing time after the end of a PRS instance, such as finishing the processing within X ms (e.g., X=4 ms) after the end of the PRS instance. In another example, a UE configured with a single-shot PRS instant measurement may avoid having to process multiple instances to report the measurements. This may result in a relaxed accuracy when single-shot processing is assumed. PRS processing may include an increased priority of mobility measurements. In yet another example, a UE configured with partially-staggered/single-symbol PRS resources may result in a reduced PRS footprint for the purpose of tight packing of PRS resources into a small window. For example, a single-symbol comb-4, 48 PRS resources may be included in a slot, with 4 beams per TRP, resulting in 12 TRPs per slot.

Figure 5:
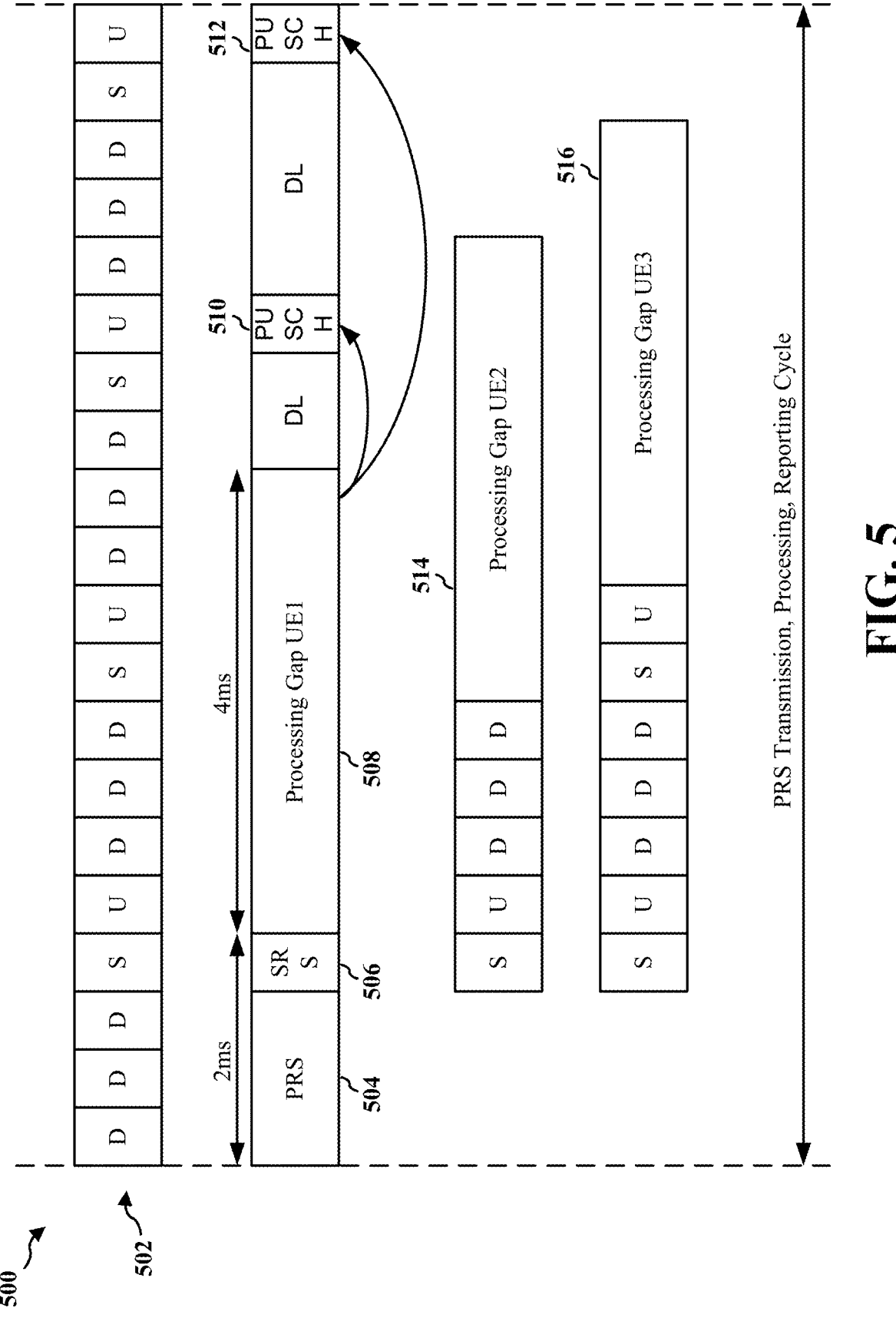
FIG. 5 is a diagram illustrating an example of PRS processing.

FIG. 5 is a diagram 500 illustrating an example of PRS processing. The diagram 500 includes an example of PRS processing across a frame structure 502. The frame structure 502 may comprise DDDSU frame structure which includes 3 downlink symbols, a special symbol which may comprise an uplink symbol or a downlink symbol, and an uplink symbol. A UE may receive a PRS within a PRS instance 504. The PRS instance 504 may be contained within a few milliseconds (e.g., 2 ms). The UE may be configured to send a positioning report every 10 msec. A PRS processing window or gap (e.g., 508, 514, 516) may be configured in a per UE (e.g., UE1, UE2, UE3) fashion. The UE may transmit SRS 506 for downlink and/or uplink positioning which may be close to the PRS instance 504. The UE may report PRS related measurements into a PUSCH (e.g., 510, 512). In some instances, the PUSCH may be scheduled via a configured grant. The UE may be configured for fast PRS processing for both periodic and aperiodic/on-demand PRS.

Aspects presented herein provide a configuration for collision rules between PRS and other downlink channels. The configuration may enable different UEs to have time-domain processing windows to ensure that network resources can be used across UEs. For example, the UE may be configured to determine to apply a PRS priority configuration in the event of a collision between PRS and a downlink channel.

In some aspects, a UE, based on UE capability, may support PRS measurements outside the measurement gap, within a PRS processing window, and a UE measurement inside the active downlink BWP with PRS having the same numerology as the active downlink BWP. For example, inside the PRS processing window, the UE may be configured to support PRS prioritization over other downlink signals or channels in all symbols inside the window. The downlink signals or channels from all downlink component carriers (CC), per UE, may be affected. In some instances, downlink signals or channels from a certain band or CC may be affected. In another example, inside the PRS processing window, the UE may be configured to support PRS prioritization over other downlink signals or channels in the PRS symbols inside the window. In some instances, a UE may be configured to declare a PRS processing capability outside of the measurement gap. PRS-related conditions may be specified and may be applicable to serving cell PRS only, or may be applicable to all PRS under conditions to PRS of non-serving cells (e.g., TRP synchronization to the serving cell, time domain overlapping with the serving cell, or single inverse fast Fourier Transform (IFFT) window at the receiver). The UE may be configured to avoid PRS processing window request and/or configuration signaling between UE and serving base station that would increase the positioning latency. In some aspects, the UE may be configured to increase the PRS measurement time compared to measurement gap based measurement. In some aspects, the base station may indicate to the UE the priority between PRS and other downlink signals or channels. In some aspects, the UE may be configured to perform measurements for within the measurement gap, if measurement gap is configured, and outside the measurement gap in a measurement period. The UE may be configured to perform PRS measurements when the condition may not be satisfied, such as when BWP switching occurs. In some aspects, prioritization conditions of processing PRS over other downlink channels or signals.

Figure 6:
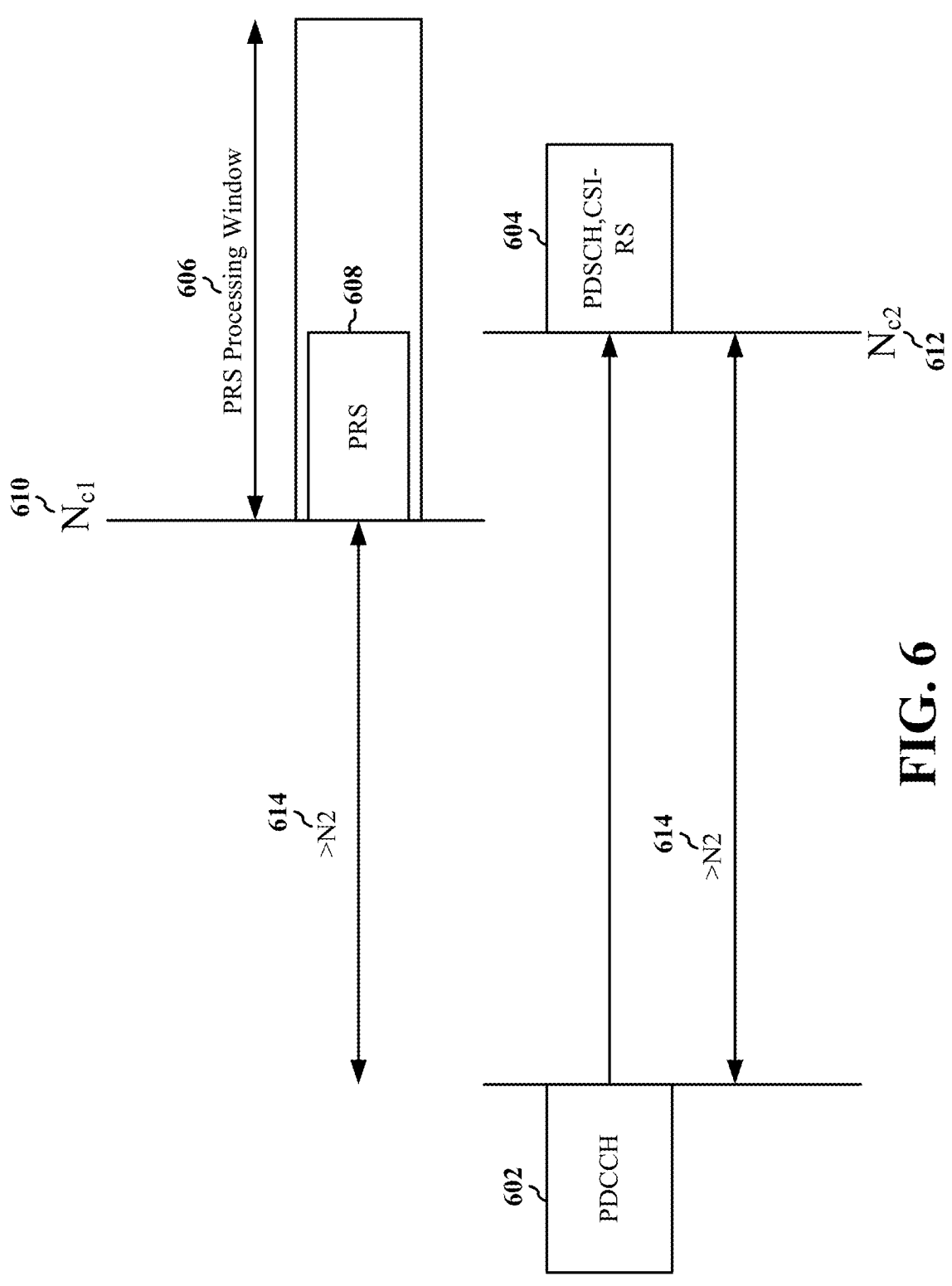
FIG. 6 is a diagram illustrating an example of collisions between PRS and a downlink channel.

FIG. 6 is a diagram 600 illustrating an example of collisions between PRS and a downlink channel. The diagram 600 provides an example of a dropping rule action time for a collision between PRS and grant-based collisions. For a PRS processing window 606 starting at a symbol $N_{c1}$ 610 of carrier $c_1$ and a conflicting transmission in carrier $c_2$ starting in symbol $N_{c2}$ 612, the UE may apply a prioritization or dropping between the PRS 608 and the conflicting transmission 604 (e.g., PDSCH, CSI-RS). For example, at least one DCI for which the time interval between the last symbol of a PDCCH 602 and $N_{c1}$ 610 is at least $N_2$ 614 symbols, and the time interval between the last symbol of the PDCCH 602 and $N_{c2}$ 612 is at least $N_2$ symbols 614, wherein the time interval unit of OFDM symbols is counted based on the smaller SCS across $c_1$, $c_2$ and their corresponding scheduling cells. If the PRS 608 and the PDCCH 602 are too close, then the UE may not have enough time to determine if the PDCCH 602 is scheduling a downlink channel that collides with the PRS 608. The time interval being at least $N_2$ symbols may allow for decoding of the PDCCH 602 to determine if a collision with the PRS 608 is present.

Figure 7:
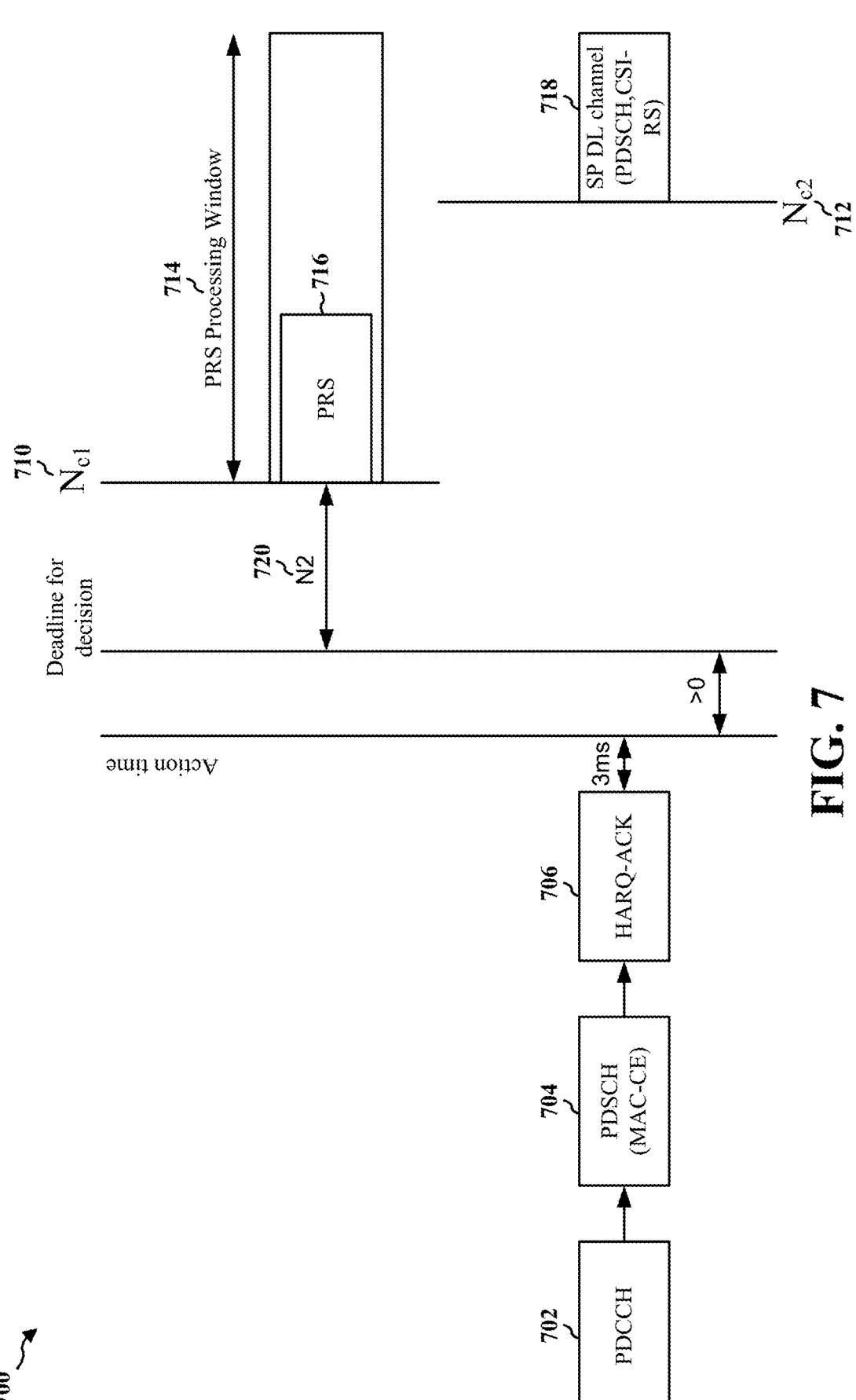
FIG. 7 is a diagram illustrating an example of collisions between PRS and a downlink channel.

FIG. 7 is a diagram 700 illustrating an example of collisions between PRS and a downlink channel. The diagram 700 provides an example of a dropping rule action time for a collision between PRS and MAC-CE triggered collisions. For a PRS processing window 714 starting at a symbol $N_{c1}$ 710 of carrier $c_1$ and a conflicting transmission 718 (e.g., PDSCH, CSI-RS) in carrier $c_2$ starting in symbol $N_{c2}$ 712, the UE may apply the prioritization or dropping between the PRS 716 and the conflicting transmission 718. For example, for MAC-CE commands for which the time interval is between the last symbol of the channel transmitting the corresponding HARQ-ACK 706 of the PDSCH (e.g., MAC-CE) 704, and $N_{c1}$ 710 is at least 3 msec+$N_2$ symbols 720. The time interval unit of OFDM symbols may be counted based on the smaller SCS spacing across $c_1$, $c_2$ and their corresponding scheduling cells. A time of 3 msec may comprise an amount of time where the UE may decode the MAC-CE and determine that the SP downlink channel 718 may or may not collide with PRS 716, such that the UE may determine whether or not to apply the PRS priority configuration rules.

In some aspects, the UE may report PRS processing window capabilities to the base station. In some aspects, instead of reporting the PRS processing capabilities to the LMF, the UE may report the PRS processing capabilities to the serving base station, such that the base station may have knowledge of what may be potentially dropped by the UE based on the PRS priority configuration.

Figure 8:
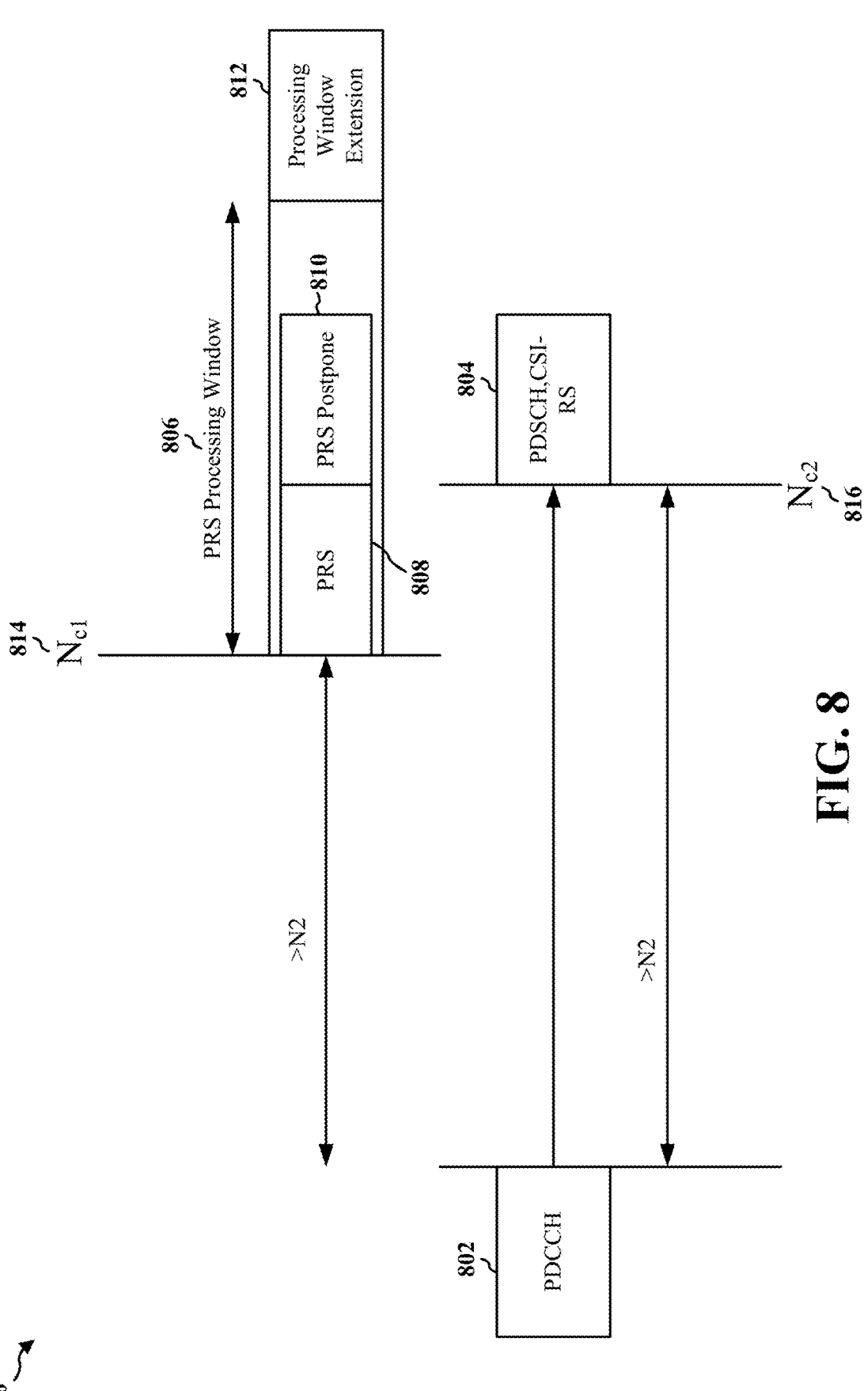
FIG. 8 is a diagram illustrating an example of a processing window extension.

FIG. 8 is a diagram 800 illustrating an example of a processing window extension. The diagram 800 provides an example of an extension of the processing window in the event of a collision. For a PRS processing window 806 starting at a symbol $N_{c1}$ 814 of carrier $c_1$, and a conflicting transmission (e.g., PDSCH, CSI-RS 804) in carrier $c_2$ starting in symbol $N_{c2}$ 816 scheduled by PDCCH 802, the UE, in aspects where other high priority channels may appear within the processing window 806, may be configured to postpone the PRS processing (e.g., 810) of the PRS 808 during the PRS processing window 806. The UE may increase the PRS processing window 806 by a processing window extension 812. The processing window extension 812 may correspond to at least an amount that corresponds to an amount after the end of the higher priority channel (e.g., 804) processing.

In some aspects, the postponing of PRS processing may be for a longer period of time greater than the collision with the higher priority channel. If the higher priority channel is PDSCH, then the PRS processing may continue after the UE sends a HARQ-ACK. If the higher priority channel is CSI-RS, then the PRS processing may continue after the UE sends a CSI report. In some aspects, different priority rules may be utilized when colliding with the same channel. For example, if PRS collides with CSI-RS, the CSI-RS may be extended, such that receipt of the PRS is given priority. In another example, if PRS collides with CSI-RS, the processing of the CSI-RS may be dropped.

Figure 9:
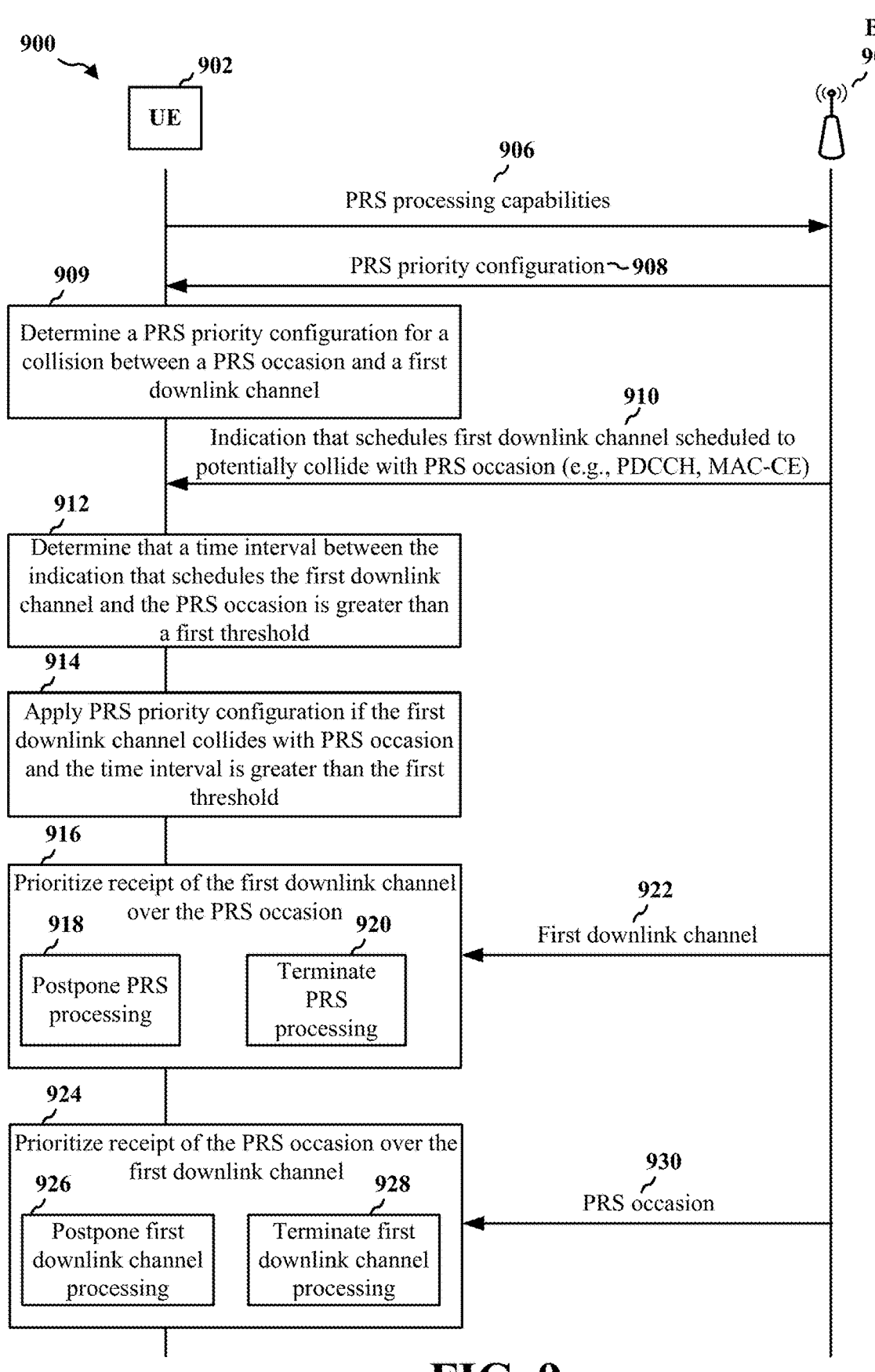
FIG. 9 is a call flow diagram of signaling between a UE and a base station.

FIG. 9 is a call flow diagram 900 of signaling between a UE 902 and a base station 904. The base station 904 may be configured to provide at least one cell. The UE 902 may be configured to communicate with the base station 904. For example, in the context of FIG. 1, the base station 904 may correspond to base station 102/180 and, accordingly, the cell may include a geographic coverage area 110 in which communication coverage is provided and/or small cell 102' having a coverage area 110'. Further, a UE 902 may correspond to at least UE 104. In another example, in the context of FIG. 3, the base station 904 may correspond to base station 310 and the UE 902 may correspond to UE 350.

At 906, the UE 902 may report PRS processing capabilities of the UE. The UE may report the PRS processing capabilities to the base station 904. The base station 904 may receive the PRS processing capabilities from the UE 902. The PRS processing capabilities may indicate whether the UE is configured to process PRS.

At 908, the base station 904 may transmit a PRS priority configuration to the UE 902. The UE 902 may receive the PRS priority configuration from the base station 904. The PRS priority configuration may include a priority for a collision between a PRS occasion and a first downlink channel. In some aspects, the PRS occasion may comprise a PRS processing window and a downlink PRS.

At 909, the UE 902 may determine the PRS priority configuration. The UE 902 may determine the PRS priority configuration for a collision between the PRS occasion and the first downlink channel.

At 910, the base station 904 may transmit an indication that schedules a first downlink channel to the UE 902. The UE 902 may receive the indication scheduling the first downlink channel from the base station 904. The first downlink channel may be scheduled to potentially collide with the PRS occasion. In some aspects, the indication may comprise at least one of a physical downlink control channel (PDCCH) or a medium access control (MAC) control element (CE) (MAC-CE). The first downlink channel may comprise at least one of a PDSCH or CSI-RS.

At 912, the UE 902 may determine that a time interval between the indication that schedules the first downlink channel and the PRS occasion is greater than a first threshold. The time interval may be based on a separation between at least a last symbol of the indication and a first symbol of the PRS occasion. In some aspects, the time interval may be based on a number of symbols between at least the last symbol of the indication and the first symbol of the PRS occasion. The first threshold may be at least N symbols. A unit of symbols of the time interval may be based on a lowest value SCS across a first channel, a second channel, and corresponding scheduling cells. For example, the PRS may have a first SCS, the PDCCH may have a second SCS, and the scheduled downlink channel may have a third SCS, such that the unit of symbol of the time interval may be based on the lowest SCS of the first SCS, second SCS, or third SCS. In some aspects, a first channel may correspond to the PRS component carrier (CC), a second channel may correspond to the CC for the scheduled downlink transmission, while the scheduling cell may correspond to the SCS of the PDCCH. In some aspects, the PDCCH may be in a scheduling cell that is different than that of the scheduled downlink channel. In some aspects, the indication may further comprise an acknowledgement (ACK) or non-acknowledgement (NACK) scheduled prior to the first downlink channel. The first threshold may be based on a number of symbols between a last symbol of the ACK or NACK plus a time separation and the first symbol of the PRS occasion.

At 914, the UE 902 may apply the PRS priority configuration. The UE 902 may apply the PRS priority configuration if the first downlink channel collides with the PRS occasion and the time interval is greater than the first threshold. For example, at 916, the UE may prioritize receipt of the first downlink channel over the PRS occasion. In some aspects, for example at 918, the UE may postpone a PRS processing within a PRS processing window to allow for processing of the first downlink channel. The PRS processing window may be extended by an extended time that corresponds to at least an amount of processing time of the first downlink channel. In some aspects, the PRS processing may resume upon completion of the processing of the first downlink channel. In some aspects, the extended time may be greater than the processing time of the first downlink channel. In some aspects, for example at 920, the UE may terminate a PRS processing within a PRS processing window to allow for processing of the first downlink channel. The UE 902, at 922, may receive the first downlink channel in response to the application of the PRS priority configuration.

As another example, at 924, the UE 902 may prioritize receipt of the PRS occasion over the first downlink channel. In some aspects, for example at 926, the UE may postpone a processing time of the first downlink channel to allow for processing of the PRS occasion. The processing time of the first downlink channel is extended by an extended time that corresponds to an amount of processing time of the PRS occasion. In some aspects, for example at 928, the UE may terminate a processing time of the first downlink channel to allow for processing of the PRS occasion. In some aspects, the PRS occasion may be prioritized over the first downlink channel if the first downlink channel is scheduled to collide with one or more PRS symbols within the PRS occasion. The UE 902, at 930, may monitor for the PRS occasion 930, such that the UE 902 may receive a PRS and process the PRS. In some aspects, the UE may be configured with a measurement gap when the UE is expected to measure PRS within an active BWP.

FIG. 10 is a flowchart 1000 of a method of wireless communication. The method may be performed by a UE or a component of a UE (e.g., the UE 104; the apparatus 1202; the cellular baseband processor 1204, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may allow a UE to determine to apply a PRS priority configuration in the event of a collision between PRS and a downlink channel.

At 1002, the UE may determine a PRS priority configuration. For example, 1002 may be performed by priority configuration component 1242 of apparatus 1202. The PRS priority configuration may include a priority for a collision between a PRS occasion and a first downlink channel. In some aspects, the PRS occasion may comprise a PRS processing window, a downlink PRS, or both.

At 1004, the UE may receive an indication that schedules the first downlink channel. For example, 1004 may be performed by indication component 1244 of apparatus 1202. The UE may receive the indication scheduling the first downlink channel from the base station. The first downlink channel may be scheduled to potentially collide with the PRS occasion. In some aspects, the indication may comprise at least one of a PDCCH or a MAC-CE. The first downlink channel may comprise at least one of a PDSCH or CSI-RS.

At 1006, the UE may determine that a time interval between the indication that schedules the first downlink channel and the PRS occasion is greater than a first threshold. For example, 1006 may be performed by time interval component 1246 of apparatus 1202. The time interval may be based on a separation between at least a last symbol of the indication and a first symbol of the PRS occasion. In some aspects, the time interval may be based on a number of symbols between at least the last symbol of the indication and the first symbol of the PRS occasion. The first threshold may be at least N symbols. A unit of symbols of the time interval may be based on a lowest value SCS across a first channel, a second channel, and corresponding scheduling cells. For example, the PRS may have a first SCS, the PDCCH may have a second SCS, and the scheduled downlink channel may have a third SCS, such that the unit of symbol of the time interval may be based on the lowest SCS of the first SCS, second SCS, or third SCS. In some aspects, a first channel may correspond to the PRS CC, a second channel may correspond to the CC for the scheduled downlink transmission, while the scheduling cell may correspond to the SCS of the PDCCH. In some aspects, the PDCCH may be in a scheduling cell that is different than that of the scheduled downlink channel. In some aspects, the indication may further comprise an ACK or NACK scheduled prior to the first downlink channel. The first threshold may be based on a number of symbols between a last symbol of the ACK or NACK plus a time separation and the first symbol of the PRS occasion.

At 1008, the UE may apply the PRS priority configuration. For example, 1008 may be performed by priority configuration component 1242 of apparatus 1202. The UE may apply the PRS priority configuration if the first downlink channel collides with the PRS occasion and the time interval is greater than the first threshold.

FIG. 11 is a flowchart 1100 of a method of wireless communication. The method may be performed by a UE or a component of a UE (e.g., the UE 104; the apparatus 1202; the cellular baseband processor 1204, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may allow a UE to determine to apply a PRS priority configuration in the event of a collision between PRS and a downlink channel.

At 1102, the UE may report PRS processing capabilities of the UE. For example, 1102 may be performed by capability component 1240 of apparatus 1202. The UE may report the PRS processing capabilities to the base station. The PRS processing capabilities may indicate whether the UE is configured to process PRS.

At 1104, the UE may receive a PRS priority configuration. For example, 1104 may be performed by priority configuration component 1242 of apparatus 1202. The UE may receive the PRS priority configuration from a base station. The PRS priority configuration may include a priority for a collision between a PRS occasion and a first downlink channel. In some aspects, the PRS occasion may comprise a PRS processing window, a downlink PRS, or both.

At 1105, the UE may determine the PRS priority configuration. For example, 1105 may be performed by priority configuration component 1242 of apparatus 1202. The UE may determine the PRS priority configuration for a collision between the PRS occasion and the first downlink channel.

At 1106, the UE may receive an indication that schedules the first downlink channel. For example, 1106 may be performed by indication component 1244 of apparatus 1202. The UE may receive the indication scheduling the first downlink channel from the base station. The first downlink channel may be scheduled to potentially collide with the PRS occasion. In some aspects, the indication may comprise at least one of a PDCCH or a MAC-CE. The first downlink channel may comprise at least one of a PDSCH or CSI-RS.

At 1108, the UE may determine that a time interval between the indication that schedules the first downlink channel and the PRS occasion is greater than a first threshold. For example, 1108 may be performed by time interval component 1246 of apparatus 1202. The time interval may be based on a separation between at least a last symbol of the indication and a first symbol of the PRS occasion. In some aspects, the time interval may be based on a number of symbols between at least the last symbol of the indication and the first symbol of the PRS occasion. The first threshold may be at least N symbols. A unit of symbols of the time interval may be based on a lowest value SCS across a first channel, a second channel, and corresponding scheduling cells. For example, the PRS may have a first SCS, the PDCCH may have a second SCS, and the scheduled downlink channel may have a third SCS, such that the unit of symbol of the time interval may be based on the lowest SCS of the first SCS, second SCS, or third SCS. In some aspects, a first channel may correspond to the PRS component carrier (CC), a second channel may correspond to the CC for the scheduled downlink transmission, while the scheduling cell may correspond to the SCS of the PDCCH. In some aspects, the PDCCH may be in a scheduling cell that is different than that of the scheduled downlink channel. In some aspects, the indication may further comprise an ACK or NACK scheduled prior to the first downlink channel. The first threshold may be based on a number of symbols between a last symbol of the ACK or NACK plus a time separation and the first symbol of the PRS occasion.

At 1110, the UE may apply the PRS priority configuration. For example, 1110 may be performed by priority configuration component 1242 of apparatus 1202. The UE may apply the PRS priority configuration if the first downlink channel collides with the PRS occasion and the time interval is greater than the first threshold. For example, at 1112, the UE may prioritize receipt of the first downlink channel over the PRS occasion. For example, 1112 may be performed by priority configuration component 1242 of apparatus 1202. In some aspects, the UE may postpone a PRS processing within a PRS processing window to allow for processing of the first downlink channel. The PRS processing window may be extended by an extended time that corresponds to at least an amount of processing time of the first downlink channel. In some aspects, the PRS processing may resume upon completion of the processing of the first downlink channel. In some aspects, the extended time may be greater than the processing time of the first downlink channel. In some aspects, the UE may terminate a PRS processing within a PRS processing window to allow for processing of the first downlink channel.

As another example, at 1114, the UE may prioritize receipt of the PRS occasion over the first downlink channel. For example, 1114 may be performed by priority configuration component 1242 of apparatus 1202. In some aspects, the UE may postpone a processing time of the first downlink channel to allow for processing of the PRS occasion. The processing time of the first downlink channel is extended by an extended time that corresponds to an amount of processing time of the PRS occasion. In some aspects, the UE may terminate a processing time of the first downlink channel to allow for processing of the PRS occasion. In some aspects, the PRS occasion may be prioritized over the first downlink channel if the first downlink channel is scheduled to collide with one or more PRS symbols within the PRS occasion. In some aspects, the UE may be configured with a measurement gap when the UE is expected to measure PRS within an active BWP.

Figure 12:
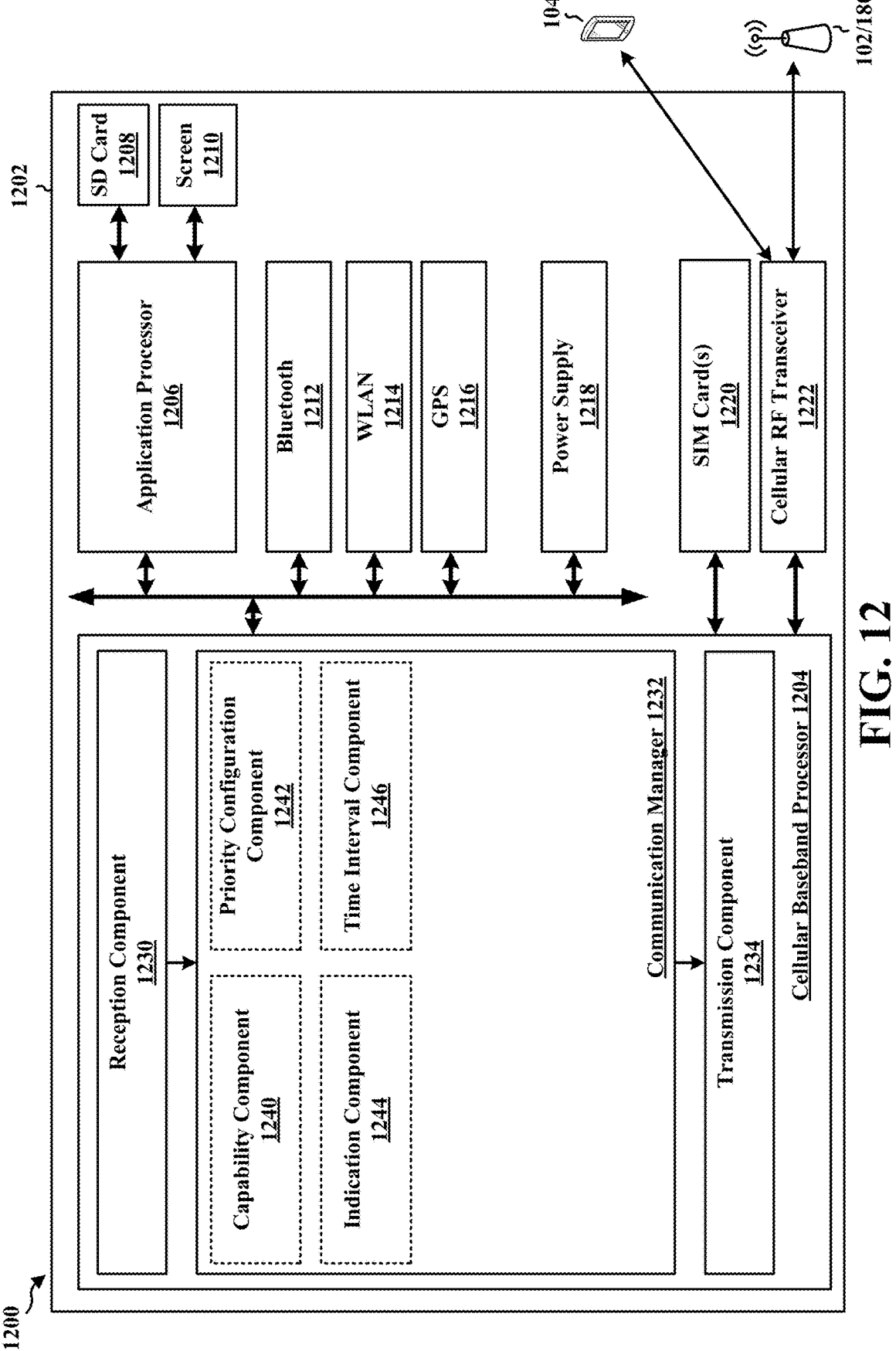
FIG. 12 is a diagram illustrating an example of a hardware implementation for an example apparatus.

FIG. 12 is a diagram 1200 illustrating an example of a hardware implementation for an apparatus 1202. The apparatus 1202 may be a UE, a component of a UE, or may implement UE functionality. In some aspects, the apparatus 1202 may include a cellular baseband processor 1204 (also referred to as a modem) coupled to a cellular RF transceiver 1222. In some aspects, the apparatus 1202 may further include one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, or a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the additional modules of the apparatus 1202.

The communication manager 1232 includes a capability component 1240 that is configured to report PRS processing capabilities of the UE, e.g., as described in connection with

1102 of FIG. 11. The communication manager 1232 further includes a priority configuration component 1242 that is configured to receive a PRS priority configuration, e.g., as described in connection with 1104 of FIG. 11. The priority configuration component 1242 may be further configured to determine the PRS priority configuration, e.g., as described in connection with 1002 of FIG. 10 or 1105 of FIG. 11. The priority configuration component 1242 may be further configured to apply the PRS priority configuration, e.g., as described in connection with 1008 of FIG. 10 or 1110 of FIG. 11. The priority configuration component 1242 may be further configured to prioritize receipt of the first downlink channel over the PRS occasion, e.g., as described in connection with 1112 of FIG. 11. The priority configuration component 1242 may be further configured to prioritize receipt of the PRS occasion over the first downlink channel, e.g., as described in connection with 1114 of FIG. 11. The communication manager 1232 further includes an indication component 1244 that is configured to receive an indication that schedules the first downlink channel, e.g., as described in connection with 1004 of FIG. 10 or 1106 of FIG. 11. The communication manager 1232 further includes a time interval component 1246 that is configured to determine that a time interval between the indication that schedules the first downlink channel and the PRS occasion is greater than a first threshold, e.g., as described in connection with 1006 of FIG. 10 or 1108 of FIG. 11.

The apparatus may include additional components that perform each of the blocks of the algorithm in the flowcharts of FIGS. 10 and 11. As such, each block in the flowcharts of FIGS. 10 and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the cellular baseband processor 1204, includes means for determining a PRS priority configuration including a priority for a collision between a PRS occasion and a first downlink channel. The apparatus includes means for receiving an indication that schedules the first downlink channel. The first downlink channel scheduled to potentially collide with the PRS occasion. The apparatus includes means for determining that a time interval between the indication that schedules the first downlink channel and the PRS occasion is greater than a first threshold. The time interval is based on a separation between at least a last symbol of the indication and a first symbol of the PRS occasion. The apparatus includes means for applying the PRS priority configuration if the first downlink channel collides with the PRS occasion and the time interval is greater than the first threshold. The apparatus further includes means for prioritizing receipt of the first downlink channel over the PRS occasion. The apparatus further includes means for postponing a PRS processing within a PRS processing window to allow for processing of the first downlink channel. The PRS processing window is extended by an extended time that corresponds to at least an amount of processing time of the first downlink channel. The apparatus further includes means for terminating a PRS processing within a PRS processing window to allow for processing of the first downlink channel. The apparatus further includes means for prioritizing receipt of the PRS occasion over the first downlink channel. The apparatus further includes means for postponing a processing time of the first downlink channel to allow for processing of the PRS occasion. The processing time of the first downlink channel is extended by an extended time that corresponds to an amount of processing time of the PRS occasion. The apparatus further includes means for terminating a processing time of the first downlink channel to allow for processing of the PRS occasion. The apparatus further includes means for reporting PRS processing capabilities of the UE. The apparatus further includes means for receiving the PRS priority configuration including the priority for the collision between the PRS occasion and the first downlink channel. The means may be one or more of the components of the apparatus 1202 configured to perform the functions recited by the means. As described supra, the apparatus 1202 may include the TX Processor 368, the RX Processor 356, and the controller/processor 359. As such, in one configuration, the means may be the TX Processor 368, the RX Processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and at least one transceiver and configured to determine a PRS priority configuration including a priority for a collision between a PRS occasion and a first downlink channel; receive an indication that schedules the first downlink channel, the first downlink channel scheduled to potentially collide with the PRS occasion; determine that a time interval between the indication that schedules the first downlink channel and the PRS occasion is greater than a first threshold, the time interval is based on a separation between at least a last symbol of the indication and a first symbol of the PRS occasion; and apply the PRS priority configuration if the first downlink channel collides with the PRS occasion and the time interval is greater than the first threshold.

Aspect 2 is the apparatus of aspect 1, further includes that the PRS occasion comprises a PRS processing window, a downlink PRS, or both.

Aspect 3 is the apparatus of any of aspects 1 and 2, further includes that the indication comprises at least one of a PDCCH or a MAC-CE.

Aspect 4 is the apparatus of any of aspects 1-3, further includes that the first downlink channel comprises at least one of a PDSCH or CSI-RS.

Aspect 5 is the apparatus of any of aspects 1-4, further includes that the time interval is based on a number of symbols between at least the last symbol of the indication and the first symbol of the PRS occasion.

Aspect 6 is the apparatus of any of aspects 1-5, further includes that the first threshold is at least N symbols, wherein a unit of symbols of the time interval is based on a lowest value SCS across a first channel, a second channel, and corresponding scheduling cells.

Aspect 7 is the apparatus of any of aspects 1-6, further includes that the indication further comprises an ACK or NACK scheduled prior to the first downlink channel, wherein the first threshold is based on a number of symbols between a last symbol of the ACK or NACK plus a time separation and the first symbol of the PRS occasion.

Aspect 8 is the apparatus of any of aspects 1-7, further includes that to apply the PRS priority configuration the at least one processor is further configured to prioritize receipt of the first downlink channel over the PRS occasion.

Aspect 9 is the apparatus of any of aspects 1-8, further includes that the at least one processor is further configured to postpone a PRS processing within a PRS processing window to allow for processing of the first downlink channel, wherein the PRS processing window is extended by an extended time that corresponds to at least an amount of processing time of the first downlink channel.

Aspect 10 is the apparatus of any of aspects 1-9, further includes that the PRS processing resumes upon completion of the processing of the first downlink channel.

Aspect 11 is the apparatus of any of aspects 1-10, further includes that the extended time is greater than the processing time of the first downlink channel.

Aspect 12 is the apparatus of any of aspects 1-11, further includes that the at least one processor is further configured to terminate a PRS processing within a PRS processing window to allow for processing of the first downlink channel.

Aspect 13 is the apparatus of any of aspects 1-12, further includes that to apply the PRS priority configuration the at least one processor is further configured to prioritize receipt of the PRS occasion over the first downlink channel.

Aspect 14 is the apparatus of any of aspects 1-13, further includes that the at least one processor is further configured to postpone a processing time of the first downlink channel to allow for processing of the PRS occasion, wherein the processing time of the first downlink channel is extended by an extended time that corresponds to an amount of processing time of the PRS occasion.

Aspect 15 is the apparatus of any of aspects 1-14, further includes that the at least one processor is further configured to terminate a processing time of the first downlink channel to allow for processing of the PRS occasion.

Aspect 16 is the apparatus of any of aspects 1-15, further includes that the PRS occasion is prioritized over the first downlink channel if the first downlink channel is scheduled to collide with one or more PRS symbols within the PRS occasion.

Aspect 17 is the apparatus of any of aspects 1-16, further includes that the at least one processor is further configured to report PRS processing capabilities of the UE.

Aspect 18 is the apparatus of any of aspects 1-17, further includes that the at least one processor is further configured to receive the PRS priority configuration including the priority for the collision between the PRS occasion and the first downlink channel.

Aspect 19 is the apparatus of any of aspects 1-18, further includes that the UE is configured with a measurement gap when the UE is expected to measure PRS within an active BWP.

Aspect 20 is a method of wireless communication for implementing any of aspects 1-19.

Aspect 21 is an apparatus for wireless communication including means for implementing any of aspects 1-19.

Aspect 22 is a computer-readable medium storing computer executable code, where the code when executed by a processor causes the processor to implement any of aspects 1-19.

What is claimed is:

1. An apparatus for wireless communication at a user equipment (UE), comprising:
   a memory;
   at least one transceiver; and
   at least one processor, communicatively connected to the memory and the at least one transceiver, the at least one processor configured to:
      determine a positioning reference signal (PRS) priority configuration including a priority for a collision between a PRS occasion and a first downlink channel;
      receive an indication that schedules the first downlink channel, the first downlink channel scheduled to potentially collide with the PRS occasion;
      determine that a time interval between the indication that schedules the first downlink channel and the PRS occasion is greater than a first threshold, the time interval is based on a separation between at least a last symbol of the indication and a first symbol of the PRS occasion; and apply the PRS priority configuration if the first downlink channel collides with the PRS occasion and the time interval is greater than the first threshold.

2. The apparatus of claim 1, wherein the PRS occasion comprises a PRS processing window, a downlink PRS, or both.

3. The apparatus of claim 1, wherein the indication comprises at least one of a physical downlink control channel (PDCCH) or a medium access control (MAC) control element (CE) (MAC-CE).

4. The apparatus of claim 3, wherein the first downlink channel comprises at least one of a physical downlink shared channel (PDSCH) or channel state information resource signal (CSI-RS).

5. The apparatus of claim 1, wherein the time interval is based on a number of symbols between at least the last symbol of the indication and the first symbol of the PRS occasion.

6. The apparatus of claim 5, wherein the first threshold is at least N symbols, wherein a unit of symbols of the time interval is based on a lowest value subcarrier spacing (SCS) across a first channel, a second channel, and corresponding scheduling cells.

7. The apparatus of claim 5, wherein the indication further comprises an acknowledgement (ACK) or non-acknowledgement (NACK) scheduled prior to the first downlink channel, wherein the first threshold is based on a number of symbols between a last symbol of the ACK or NACK plus a time separation and the first symbol of the PRS occasion.

8. The apparatus of claim 1, wherein to apply the PRS priority configuration the at least one processor is further configured to:

prioritize receipt of the first downlink channel over the PRS occasion.

9. The apparatus of claim 8, wherein the at least one processor is further configured to:

postpone a PRS processing within a PRS processing window to allow for processing of the first downlink channel, wherein the PRSprocessing window is extended by an extended time that corresponds to at least an amount of processing time of the first downlink channel.

10. The apparatus of claim 9, wherein the PRS processing resumes upon completion of the processing of the first downlink channel.

11. The apparatus of claim 9, wherein the extended time is greater than the processing time of the first downlink channel.

12. The apparatus of claim 8, wherein the at least one processor is further configured to:

terminate a PRS processing within a PRS processing window to allow for processing of the first downlink channel.

13. The apparatus of claim 1, wherein to apply the PRS priority configuration the at least one processor is further configured to:

prioritize receipt of the PRS occasion over the first downlink channel.

14. The apparatus of claim 13, wherein the at least one processor is further configured to:

postpone a processing time of the first downlink channel to allow for processing of the PRS occasion, wherein the processing time of the first downlink channel is extended by an extended time that corresponds to an amount of processing time of the PRS occasion.

15. The apparatus of claim 13, wherein the at least one processor is further configured to:

terminate a processing time of the first downlink channel to allow for processing of the PRS occasion.

16. The apparatus of claim 13, wherein the PRS occasion is prioritized over the first downlink channel if the first downlink channel is scheduled to collide with one or more PRS symbols within the PRS occasion.

17. The apparatus of claim 1, wherein the at least one processor is further configured to:

report PRS processing capabilities of the UE.

18. The apparatus of claim 1, wherein the at least one processor is further configured to:

receive the PRS priority configuration including the priority for the collision between the PRS occasion and the first downlink channel.

19. The apparatus of claim 1, wherein the UE is configured with a measurement gap when the UE is expected to measure PRS within an active bandwidth part (BWP).

20. A method of wireless communication at a user equipment (UE), comprising:

determining a positioning reference signal (PRS) priority configuration including a priority for a collision between a PRS occasion and a first downlink channel;

receiving an indication that schedules the first downlink channel, the first downlink channel scheduled to potentially collide with the PRS occasion;

determining that a time interval between the indication that schedules the first downlink channel and the PRS occasion is greater than a first threshold, the time interval is based on a separation between at least a last symbol of the indication and a first symbol of the PRS occasion; and applying the PRS priority configuration if the first downlink channel collides with the PRS occasion and the time interval is greater than the first threshold.

21. The method of claim 20, wherein the PRS occasion comprises a PRS processing window, a downlink PRS, or both.

22. The method of claim 20, wherein the indication comprises at least one of a physical downlink control channel (PDCCH) or a medium access control (MAC) control element (CE) (MAC-CE).

23. The method of claim 22, wherein the first downlink channel comprises at least one of a physical downlink shared channel (PDSCH) or channel state information resource signal (CSI-RS).

24. The method of claim 20, wherein the time interval is based on a number of symbols between at least the last symbol of the indication and the first symbol of the PRS occasion.

25. The method of claim 24, wherein the first threshold is at least N symbols, wherein a unit of symbols of the time interval is based on a lowest value subcarrier spacing (SCS) across a first channel, a second channel, and corresponding scheduling cells.

26. The method of claim 24, wherein the indication further comprises an acknowledgement (ACK) or non-acknowledgement (NACK) scheduled prior to the first downlink channel, wherein the first threshold is based on a number of symbols between a last symbol of the ACK or NACK plus a time separation and the first symbol of the PRS occasion.

27. The method of claim 20, wherein the applying the PRS priority configuration comprises:

prioritizing receipt of the first downlink channel over the PRS occasion.

28. The method of claim 27, further comprising:

postponing a PRS processing within a PRS processing window to allow for processing of the first downlink channel, wherein the PRS processing window is extended by an extended time that corresponds to at least an amount of processing time of the first downlink channel.

29. The method of claim 28, wherein the PRS processing resumes upon completion of the processing of the first downlink channel.

30. The method of claim 28, wherein the extended time is greater than the processing time of the first downlink channel.

31. The method of claim 27, further comprising:

terminating a PRS processing within a PRS processing window to allow for processing of the first downlink channel.

32. The method of claim 20, wherein the applying the PRS priority configuration comprises:

prioritizing receipt of the PRS occasion over the first downlink channel.

33. The method of claim 32, further comprising:

postponing a processing time of the first downlink channel to allow for processing of the PRS occasion, wherein the processing time of the first downlink channel is extended by an extended time that corresponds to an amount of processing time of the PRS occasion.

34. The method of claim 32, further comprising:

terminating a processing time of the first downlink channel to allow for processing of the PRS occasion.

35. The method of claim 32, wherein the PRS occasion is prioritized over the first downlink channel if the first downlink channel is scheduled to collide with one or more PRS symbols within the PRS occasion.

36. The method of claim 20, further comprising:

reporting PRS processing capabilities of the UE.

37. The method of claim 20, further comprising:

receiving the PRS priority configuration including the priority for the collision between the PRS occasion and the first downlink channel.

38. The method of claim 20, wherein the UE is configured with a measurement gap when the UE is expected to measure PRS within an active bandwidth part (BWP).

39. An apparatus for wireless communication at a user equipment (UE), comprising:

means for determining a positioning reference signal (PRS) priority configuration including a priority for a collision between a PRS occasion and a first downlink channel;

means for receiving an indication that schedules the first downlink channel, the first downlink channel scheduled to potentially collide with the PRS occasion;

means for determining that a time interval between the indication that schedules the first downlink channel and the PRS occasion is greater than a first threshold, the time interval is based on a separation between at least a last symbol of the indication and a first symbol of the PRS occasion; and means for applying the PRS priority configuration if the first downlink channel collides with the PRS occasion and the time interval is greater than the first threshold.

* * * * *